United States Patent Office 2,848,377
Patented Aug. 19, 1958

2,848,377
PLATINUM CATALYST COMPOSITE EMPLOYED IN THE HYDROFORMING OF A NAPHTHA

Glenn M. Webb, Western Springs, Ill., assignor to Standard Oil Company, Chicago, Ill., a corporation of Indiana No Drawing. Application October 19, 1953
Serial No. 387,074

4 Claims. (Cl. 196—50)

This invention relates to catalysts and particularly to catalysts for the conversion of hydrocarbons. More specifically, the present invention relates to platinum-containing catalysts for the hydroforming of hydrocarbons.

Catalysts for the so-called "continuous hydroforming" of petroleum naphthas, as now described in the art, consist essentially of a platinum-group metal supported on alumina, optionally with a minor proportion of another constituent, such as silica or a halogen, to act as a hydrocarbon-cracking adjuvant. A typical example of such a catalyst, described in U. S. Patent 2,479,109 which issued August 16, 1949, to Vladimir Haensel, contains alumina combined with around 0.1 to 3% of fluorine by weight of the alumina on a dry basis and from about 0.01 to 1% by weight of platinum, preferably about 0.1 to 1%.

I have now discovered a new catalyst of improved activity, selectivity, and stability in the hydroforming of gasolines, naphthas, and other hydrocarbons, and in other hydrocarbon-conversion processes for which platinum-alumina catalysts are adapted. My new catalyst contains as the essential ingredients thereof platinum, iridium, and alumina.

One object of my invention is to effect an improvement in the conversion of hydrocarbons. Another object is to prepare a new and highly effective platinum-group catalyst for use in the conversion of hydrocarbons. A further object is to prepare a mixed precious-metal alumina-supported catalyst suitable for use in hydrogenation, dehydrogenation, isomerization, and hydrocracking reactions. Another object is to prepare a reforming catalyst of high activity, selectivity, and stability, especially adapted for use in the continuous or regenerative reforming of hydrocarbons. These and other objects of my invention will be apparent from the present description thereof.

In the preparation of my new catalyst, a mixture of alumina, platinum, and iridium is prepared, and the said mixture is ultimately dried and calcined.

The alumina may be any of a large variety of forms, such as alumina hydrosol, alumina hydrogel, alumina xerogel, alumina monohydrate, sintered alumina, and the like, all of which are readily prepared by methods described in the art. The alumina should preferably be gamma-alumina and/or eta-alumina, substantially free from contaminants such as iron, manganese, molybdenum, nickel, cobalt, sodium, other alkali metals, or compounds thereof. The alumina is commingled with platinum in the form of a platinum compound such as chloroplatinic acid, platinum tetrachloride, a platinum-amine complex, bromoplatinic acid, or the like, or a solution thereof, or preferably a stable colloidal suspension of a platinum sulfide, prepared for example by commingling aqueous ammonium polysulfide with aqueous chloroplatinic acid. To this mixture is added iridium in the form of the ammonium chloride double salt, the ammonium sulphate, the tribromide, the tetrachloride, the sulfate, or the like, or a solution thereof, or a suspension of an iridium sulfide. The platinum and the iridium are each employed in a proportion between about 0.01 and 1% by weight, calculated as the metal on the basis of dry $Al_2O_3$, preferably between about 0.1 and 1%. To this mixture may optionally be added a fourth component such as silica, a fluoride, a chloride, boria, chromia, an oxide of phosphorus, or the like, suitably in the proportion of about 0.1 to 10% by weight, based on dry $Al_2O_3$. The completed catalytic mixture is preferably dried at least in part at a temperature between about 200 and 400° F. for a period between about 4 and 24 hours. The resulting cake is then calcined at a temperature preferably between about 800 and 1200° F. for around 2 to 8 hours or more. If desired, the catalytic mixture can be contacted with hydrogen or a hydrogen-containing gas at a temperature between about 300 and 600° F. for about 4 to 12 hours or more prior to the said calcining step, or the calcining step itself can be carried out in the presence of hydrogen or hydrogen-containing gas. As a further alternative, the effect of the calcining treatment can be achieved during the utilization of the catalyst at elevated temperature in the conversion of hydrocarbons.

It will be apparent that various alternative techniques may be employed in the preparation of my catalyst without departing from the spirit of my invention. I may, for example, cogel a mixture of alumina hydrosol, platinum solution, and iridium solution, and dry and calcine the resulting gel. I may cogel an alumina hydrosol with a platinum solution and impregnate the resulting gel, before or after drying and/or calcining, with iridium. Likewise, I may cogel alumina and iridium and impregnate the resulting gel with platinum. As a further alternative, I may mull an alumina gel with substances affording platinum and iridium. Other process modifications for use in the preparation of my new catalysts will be apparent to those skilled in the art.

The catalyst can be prepared in any desired mechanical form according to the specific process for which it is intended. Either before or after calcination it can be broken into lumps or granules, or it can be ground into a fine powder, suitable for use, for example, in the suspensoid or fluidized-solids processes. Alternatively, the catalyst can be formed into pills, pellets or other suitable shapes, preferably after a mild calcination at about 800 to 1000° F. In this case, the mildly calcined catalytic mixture is ground to a powder, preferably small enough to pass through a 30-mesh screen, a suitable lubricant is added, such as stearic acid, rosin, partially hydrogenated coconut oil, graphite, or the like, and the mixture is shaped by extrusion, compression in a pilling machine, or otherwise according to methods well known in the art. Pills having dimensions ranging from about ⅛" x ⅛" to ½" x ½" are highly satisfactory for most purposes. The shaped masses can then be hydrogen-treated and/or calcined, as set forth above.

My invention will be more fully understood from the following specific example:

Example

Aluminum chloride hexahydrate was dissolved in distilled water to a concentration of approximately 14% by weight, and the resulting solution was adjusted to pH 8 by stirring and adding a sufficient quantity of aqueous 10% ammonium hydroxide. A precipitate of aluminum hydroxide was formed thereby, and was separated from the aqueous liquor by filtration. The precipitate was washed thoroughly by slurrying six times in aqueous ammonium hydroxide at pH 8 and filtering. Approximately 241 grams of the washed gel were then slurried in approximately two liters of distilled water. To this slurry were added 2.2 liters of an aqueous solution containing chloroplatinic acid equivalent to 1.5 grams of platinum, 2.5 grams of iridium tetrachloride, and 10 milliliters of aqueous 20% ammonium polysulfide. The mixture was well stirred and dried at 185° F. for 24 hours and at 385°

F. for 3 hours. The dried material was crushed, formed into ⅛" cylindrical pellets, and calcined at 1100° F. for 6 hours. The completed catalyst contained 0.51 percent by weight of platinum, 0.57 percent by weight of iridium, and 0.70 percent by weight of chlorine based on dry $Al_2O_3$, and had a bulk density of 0.864 gram per milliliter and an axial crushing strength of 13.9 pounds per square inch.

For comparison, a platinum-alumina catalyst was prepared according to the same procedure, omitting the iridium. The completed catalyst contained 0.51 percent by weight of platinum and 0.52 percent by weight of chlorine, and had a bulk density of 0.849 gram per milliliter and an axial crushing strength of 13.3 pounds per square inch.

The completed catalysts were subjected to hydroforming tests in a quasi-isothermal reaction unit, employing a tubular reactor surrounded by an electrically heated metal block for temperature control. The charging stock was a Mid-Continent virgin naphtha having an ASTM boiling range of 200–360° F., a CFR–R octane number of 44, a sulfur content of 0.03 percent, an API gravity of 56.5, a Reid vapor pressure of 1.8 pounds per square inch, a bromine number of 1.4, and a content of 40 percent naphthenes, 52 percent paraffins, and 8 percent aromatics. The tests were carried out at a block temperature of 960° F., a catalyst temperature averaging about 940° F., a reactor pressure of 200 pounds per square inch gage, an hourly weight space velocity around 1.9, and a once-through hydrogen rate around 5000 cubic feet per barrel of feed. The products were collected and analyzed, with the following results:

| Product Interval, hr. | Pt-Ir Catalyst | | Pt Catalyst | |
|---|---|---|---|---|
| | Octane No., CFR-R | Yield, C₅—400° F., vol.-percent | Octane No., CFR-R | Yield, C₅—400° F., vol.-percent |
| 0-20 | 100.3 | | 100.0 | |
| 20-40 | 99.8 | | 99.5 | |
| 40-60 | 99.6 | 80.5 | 98.9 | |
| 60-80 | 99.9 | 79.5 | 98.7 | |
| 80-100 | 99.7 | | 97.1 | 83.6 |
| 100-120 | 100.2 | 77.3 | 96.5 | |
| 120-130 | 99.4 | | | |
| 120-140 | | | 96.1 | 78.3 |

The above data demonstate that my improved catalyst is markedly superior in activity maintenance to the catalysts of the prior art.

My catalyst is broadly useful in hydrocarbon-conversion reactions which are catalyzed by platinum. Specifically, my catalyst is useful for reforming, isomerization, hydrogenation, hydrocracking, dehydrogenation, oxidation, polymerization, condensation, and other reactions known in the art. The required processing conditions depend upon the specific reactions and the charging stocks involved, and may readily be determined from the teachings of the prior art. In general, my improved catalyst is suitable in the same applications and under substantially the same conditions as required for conventional platinum-alumina catalysts.

In utilizing my new catalyst for the reforming of hydrocarbons, a feed stock consisting essentially of a virgin naphtha, a cracked naphtha, or a mixture thereof, boiling within the range of about 70 to 500° F., and preferably within the range of about 180 to 375° F., is contacted in the vapor phase with the catalyst at a liquid hourly space velocity between about 1 and 10 and a temperature within the range of about 800 to 1050° F., the average temperature throughout the catalyst bed being maintained within the range of about 875 to 950° F., preferably around 900° F. Hydrogen is added to the reaction zone at a rate between about 1000 and 10,000 standard cubic feet per barrel of charging stock. The process is ordinarily operated at a pressure within the range of about 100 to 1000 pounds per square inch. Higher pressures within this range produce lower rates of carbon deposition and longer on-stream periods without catalyst deactivation, but at a penalty in product quality at a given yield level. Lower pressures, on the other hand (i. e., up to about 500 pounds per square inch gage), produce reformates of substantially higher octane number, but at the cost of increased rate of carbon deposition, with consequent shortening of the time on stream. At any pressure, the catalyst ultimately becomes deactivated to some extent through the effects of carbon and sulfur deposition and other factors not well understood, and must be regenerated. This can effectively be accomplished by burning the deposits therefrom with air or other oxygen-containing gas under carefully controlled conditions at a temperature below the sintering point of the catalyst, preferably between about 825 and 1300° F. The catalyst properties may thereafter be additionally improved by soaking the catalyst for 1 to 24 hours at a temperature between 950 and 1300° F. in a gas containing oxygen at a partial pressure above about 0.4 atmosphere. The regenerated catalyst may optionally be subjected to contact with a hydrogen-containing gas at a temperature within or around the hydroforming range before being returned to on-stream conditions.

My new catalyst can be employed in any of the conventional types of equipment known to the art. I may, for example, employ the catalyst in the form of pills, pellets, spheres, granules, broken fragments, or various special shapes, dispersed as a fixed bed within a reaction zone, and the charging stock may be passed therethrough as a liquid, vapor, or mixed phase, and in either upward or downward flow. Alternatively, I may prepare the catalyst in a suitable form for use in moving beds, in which the charging stock and catalyst are ordinarily passed in parallel flow; or in fluidized-solid processes, in which the charging stock is passed upward through a turbulent bed of finely divided catalyst; or in the suspensoid process, in which the catalyst is slurried in the charging stock and the resulting mixture is conveyed into the reaction zone. The reaction products from any of the foregoing processes are separated from the catalyst, vented to atmospheric pressure, and fractionated to recover the various components thereof. The hydrogen and unconverted materials are recycled as desired.

While I have described my invention with reference to certain specific embodiments thereof, it should be understood that such embodiments are illustrative only and not by way of limitation. Various modifications of my invention and alternative compositions, operating procedures, and conditions will be apparent from the foregoing description to those skilled in the art.

In accordance with the foregoing description, I claim as my invention:

1. A catalyst suitable for use in the conversion of hydrocarbons consisting essentially of alumina, between about 0.1 and 1 percent by weight of platinum, and between about 0.1 and 1 percent by weight of iridium, based on dry $Al_2O_3$.

2. A catalyst suitable for use in the conversion of hydrocarbons consisting essentially of alumina, between about 0.1 and 1 percent by weight of platinum, between about 0.1 and 1 percent by weight of iridium, and between about 0.1 and 10 percent by weight of a cracking adjuvant, based on dry $Al_2O_3$.

3. A hydrocarbon-conversion process which comprises the steps of contacting a hydrocarbon charging stock under conversion conditions with a catalyst consisting essentially of alumina, between about 0.1 and 1 percent by weight of platinum, and between about 0.1 and 1 percent by weight of iridium, based on dry $Al_2O_3$, and separating conversion products therefrom.

4. A hydroforming process which comprises the steps of contacting a petroleum naphtha boiling between about 180 and 375° F. with a catalyst consisting essentially of alumina, between about 0.1 and 1 percent by weight of platinum, and between about 0.1 and 1 percent by weight of iridium, based on dry $Al_2O_3$, at a temperature between about 800 and 1050° F., a pressure between about 100 and 1000 pounds per square inch gage, a hydrogen rate between about 1000 and 10,000 standard cubic feet per barrel of charging stock, and a liquid hourly space velocity between about 1 and 10, and withdrawing a hydroformate of improved octane number therefrom.

References Cited in the file of this patent

UNITED STATES PATENTS

| | | |
|---|---|---|
| 2,184,235 | Groll et al. | Dec. 19, 1939 |
| 2,478,916 | Haensel | Aug. 16, 1949 |
| 2,479,109 | Haensel | Aug. 16, 1949 |
| 2,635,080 | Appell | Apr. 14, 1953 |
| 2,689,208 | Murray et al. | Sept. 14, 1954 |
| 2,739,927 | Doumani | Mar. 27, 1956 |